United States Patent [19]

Takenouchi et al.

[11] Patent Number: 4,504,560
[45] Date of Patent: Mar. 12, 1985

[54] ELECTROPHOTOCONDUCTOR FOR ELECTROPHOTOGRAPHY COMPRISING A DISAZO COMPOUND

[75] Inventors: Osamu Takenouchi, Kitamoto; Khe Nguyen Chanh, Warabi; Tatsuo Kawara; Hisami Tanaka, both of Tokyo, all of Japan

[73] Assignee: Dainippon Ink and Chemicals, Inc., Tokyo, Japan

[21] Appl. No.: 560,481

[22] Filed: Dec. 12, 1983

[30] Foreign Application Priority Data

Dec. 21, 1982 [JP]  Japan ................................ 57-222964

[51] Int. Cl.$^3$ ............................................. G03G 5/06
[52] U.S. Cl. ........................................ 430/72; 430/58; 430/75; 430/76; 534/657; 534/738
[58] Field of Search ...................... 430/72, 56, 58, 59; 260/152, 158, 156, 164, 174, 181

[56] References Cited

U.S. PATENT DOCUMENTS 4,390,608  6/1983  Hashimoto et al. ............. 430/59 X
4,391,889  7/1983  Mabuchi et al. ..................... 430/59

Primary Examiner—John D. Welsh
Attorney, Agent, or Firm—Sherman & Shalloway

[57] ABSTRACT

An electrophotoconductor comprising an electrically conductive support and formed on the surface thereof a photosensitive layer containing a disazo compound of formula

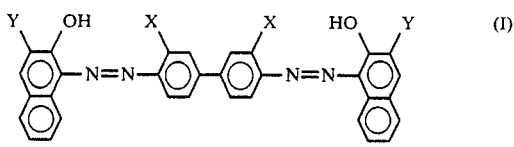

wherein
two Y's, which are the same or different, denote a group selected from the class consisting of $$-CONHN=CH-Ar, \quad (II)$$

$$-CONHN=C\begin{matrix}R_1\\\\R_2\end{matrix} \quad \text{and} \quad (III)$$

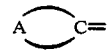

(IV)

two X's, which are the same or different, denote an atom or a group selected from the class consisting of H, $CH_3$, $OCH_3$, Cl, Br and $NO_2$, Ar denotes a group such as a phenyl group, a naphthyl group, an anthryl group, a pyridyl group, a thienyl group, a furyl group or a carbazolyl group which may have a substituent, $R_1$ and $R_2$, which are the same or different, denote an alkyl group or an aryl group that may have a substituent, and $$\overset{A}{\frown}C=$$

denotes a cylic hydrocarbon group or a heterocyclic group which may have a substituent.

14 Claims, 4 Drawing Figures

ELECTROPHOTOCONDUCTOR FOR ELECTROPHOTOGRAPHY COMPRISING A DISAZO COMPOUND

This invention relates to a photoconductor for electrophotography. More specifically, it relates to an electrophotoconductor comprising an electrically conductive support and formed thereon a photosensitive layer containing a polyazo compound.

Inorganic photoconductive materials such as selenium, cadmium sulfide and zinc oxide have heretofore found widespread use to produce photosensitive layers of electrophotoconductors. In recent years, further studies have been made of organic photoconductive materials, and some of them have been put to practical use as electrophotoconductors. The organic photoconductive materials have advantages that they are lighter in weight and easier to form into films and permit easier production of photosensitive materials than the inorganic ones.

Many investigations have been made into various polymers including polyvinyl carbazole as organic photoconductive materials. These polymers, when used singly, have poor film-formability, flexibility and adhesion. To remedy these defects, a plasticizer, a binder, etc. are added. However, this invites other problems such as decrease in sensitivity and increase in residual potentials. Accordingly, it has been very hard to put these polymers to practical use.

On the other hand, photoconductors having excellent mechanical properties can be easily obtained by using organic low-molecular-weight photoconductive compounds and selecting polymers having excellent film-formability, flexibility and adhesion as binders for such photoconductive compounds. It has been however difficult to find out compounds which are suitable for producing photoconductors having high sensitivity.

Photoconductors using specific monoazo compounds or disazo compounds as photoconductive materials have been lately reported, but suffered from drawbacks that sensitivity is insufficient, spectral sensitivity is not satisfactory and synthesis is difficult. For instance, there have been known benzidine-type disazo pigments (Japanese Laid-open Patent Application No. 37543/72), disazo pigments having a distyryl skeleton (Japanese Laid-open Patent Application No. 94358/81), disazo pigments having an N-ethylcarbazole skeleton (Japanese Laid-open Patent Application No. 94359/81) and disazo pigments having a fluorenone skeleton (Japanese Laid-open Patent Application No. 94360/81). Nevertheless, the benzidine-type disazo pigments are, though having excellent carrier generating ability, poor in carrier transportability. The disazo pigments having the distyrylbenzene skeleton, N-ethylcarbazole skeleton and fluorenone skeleton have possessed a drawback that it takes much time to synthesize them.

The present inventors have given extensive studies to organic photoconductive compounds which produce electrophotoconductors having high sensitivity, high durability and excellent carrier transportability and being easy to synthesize. Consequently it has been discovered that specific disazo compounds are preferable.

Thus, the present invention is to provide an electrophotoconductor comprising an electrically conductive support and formed on the surface thereof a photosensitive layer containing a disazo compound of formula

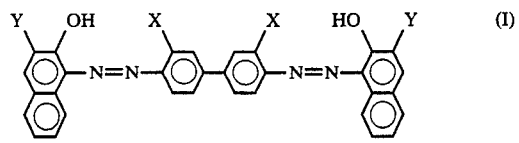

wherein two Y's, which are the same or different, denote a group selected from the class consisting of

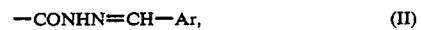

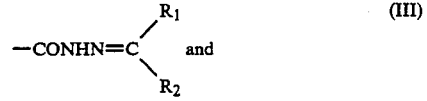

two X's, which are the same or different, denote an atom or a group selected from the class consisting of H, $CH_3$, $OCH_3$, Cl, Br and $NO_2$, Ar denotes a group such as a phenyl group, naphthyl group, an anthryl group, a pyridyl group, a thienyl group, a furyl group and a carbazolyl group which may have a substituent, $R_1$ and $R_2$, which are the same or different, denote an alkyl group or an aryl group that may have a substituent, and

denotes a cyclic hydrocarbon group or a heterocyclic group which may have a substituent.

In formula (II), examples of the substituent of Ar include alkyl groups such as methyl and ethyl, alkoxy groups such as methoxy and ethoxy, acyl groups such as acetyl and benzoyl, alkylamino groups such as dimethylamino and diethylamino, alkyl ester groups such as methyl ester and ethyl ester, a phenyl ester group, a phenylcarbamoyl group, a nitro group, and a cyano group. Ar may have two or more of these substituents which may be the same or different. In formula (III), examples of the substituents of $R_1$ and $R_2$ are the same as those in formula (II). In formula (IV),

represents divalent hydrocarbon ring residues such as

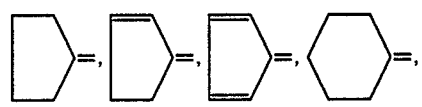

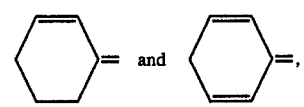

divalent heterocyclic ring residues such as divalent fused hydrocarbon ring residues such as

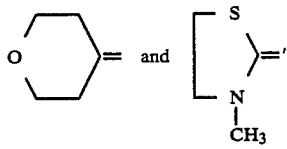

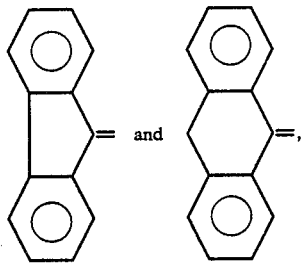

and divalent fused heterocyclic ring residues such as

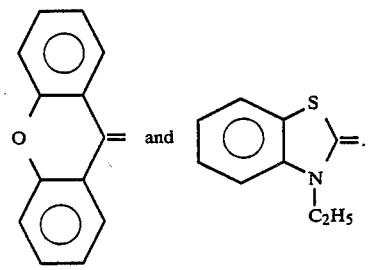

Examples of the substituent of

are the same as those of the substituent of Ar in formula (II).

The disazo compound in this invention can be prepared by a known method. For example, it can be readily prepared by tetrazodizing a diamine of formula

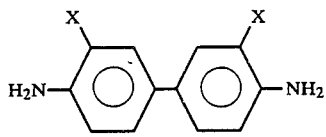

(V)

wherein two X's are as defined above, in a customary manner and then coupling the resulting substance with a coupler of formula

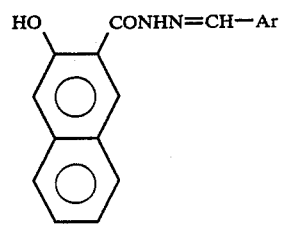

(VI)

wherein Ar is as defined above,

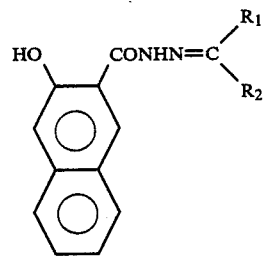

(VII)

wherein $R_1$ and $R_2$ are as defined above, or

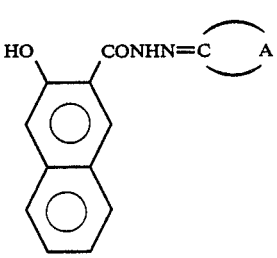

(VIII)

wherein

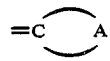

os as defomed anpve. in the presence of an alkali, or once isolating a tetrasonium salt of a diamine represented by formula (V) in the form of borofluoride or zinc chloride and then coupling the resulting substance with a coupler of formula (VI), (VII) or (VIII) in the presence of an alkali in a suitable solvent such as N,N-dimethylformamide or dimethyl sulfoxide. The coupler represented by formula (VI), (VII) or (VIII) can be easily formed by heating 2-hydroxy-3-naphthoic acid hydrazide and an aldehyde compound of formula Ar—CHO, a ketone compound of formula

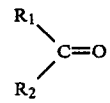

or a ketone compound of formula

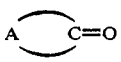

in an organic solvent such as an alcohol and if required, in the presence of an acid catalyst. Starting materials used in this invention have merits that they are easily obtainable at low cost and easy to produce.

Specific examples of the compound of formula (I) used in this invention are given below.
1.
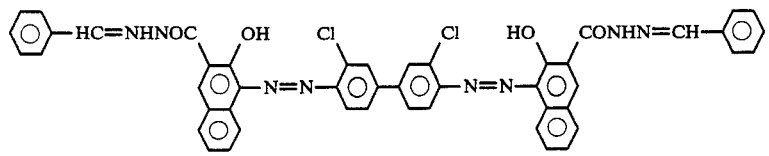
2.
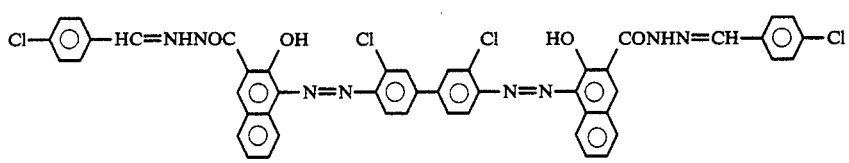
3.
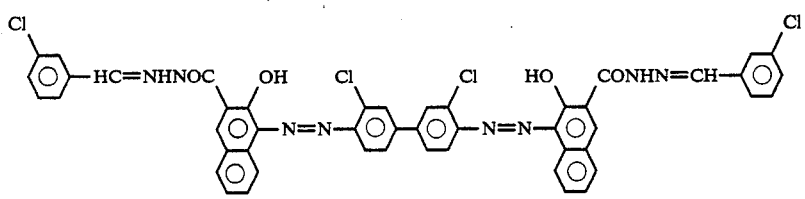
4.
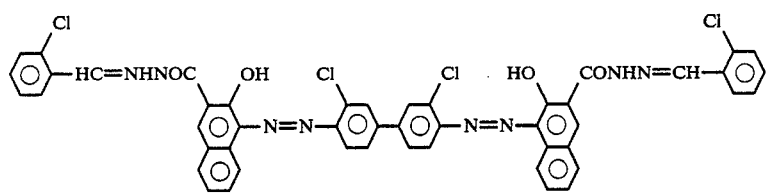
5.
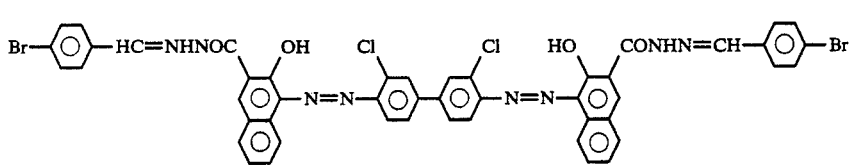
6.
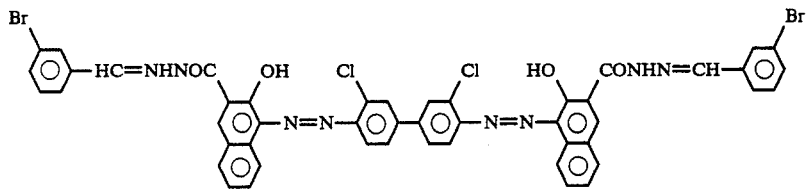
7.
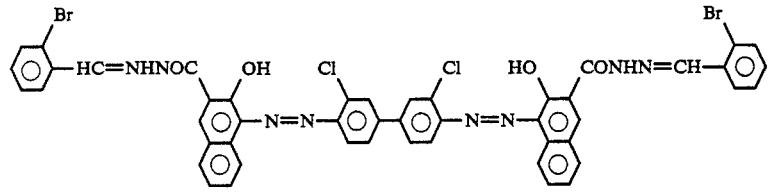
8.
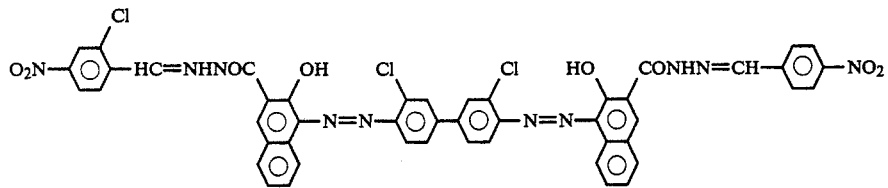

-continued
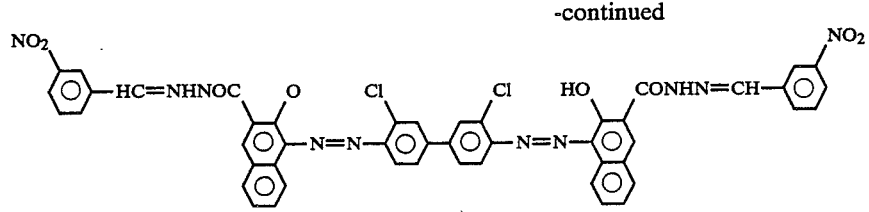
9.
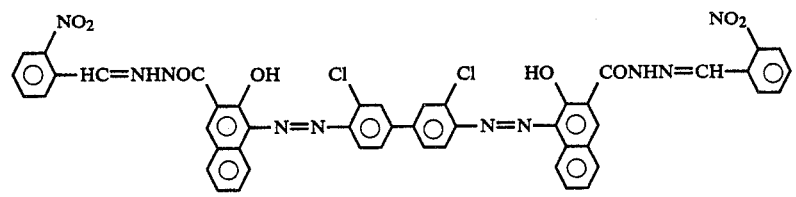
10.
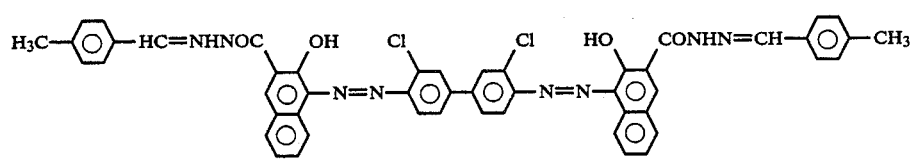
11.
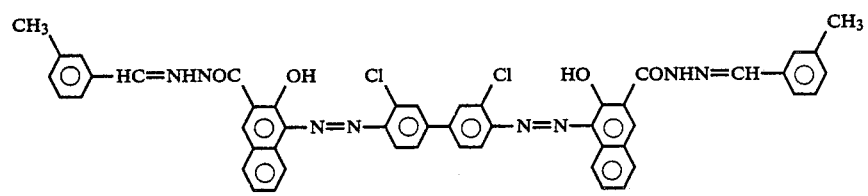
12.
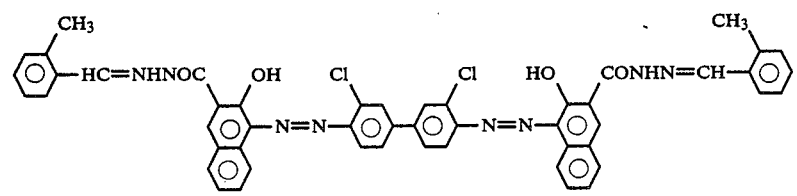
13.
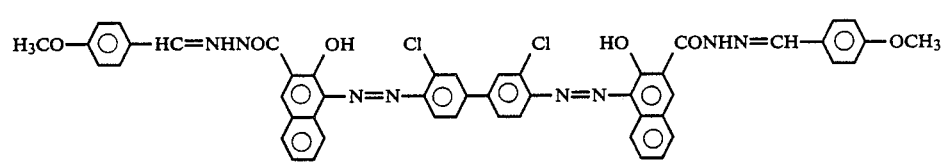
14.
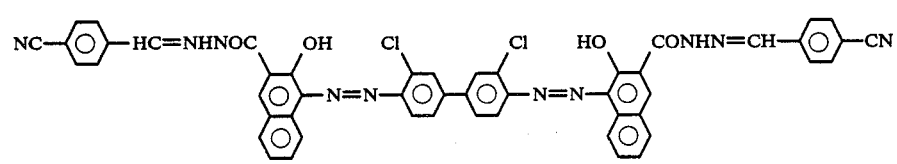
15.
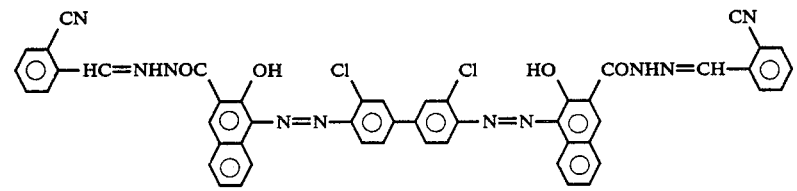
16.
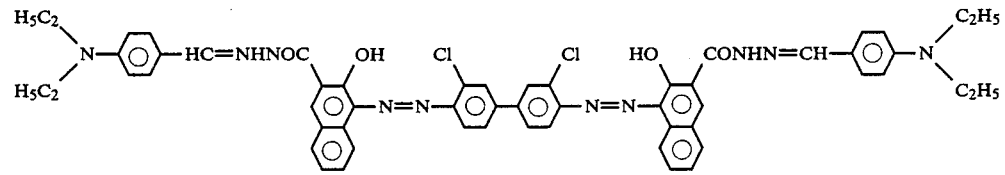
17.

-continued
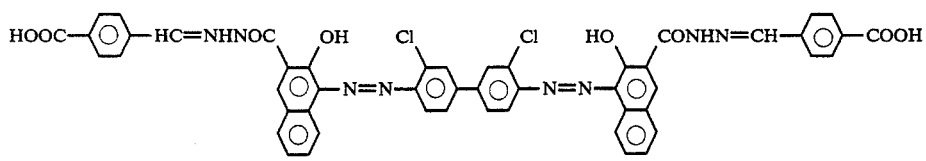
18.
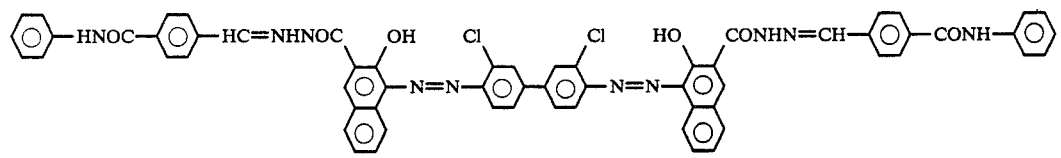
19.
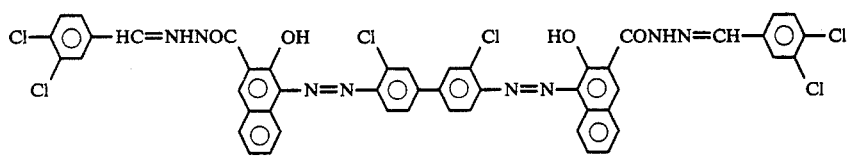
20.
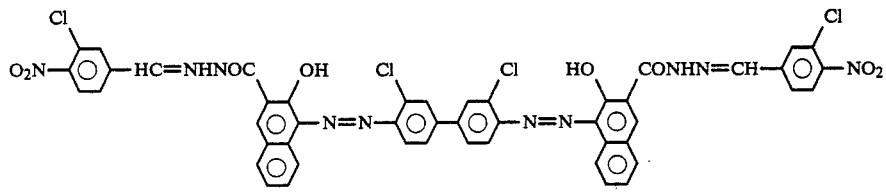
21.
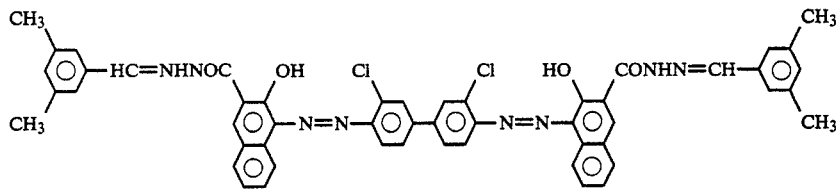
22.
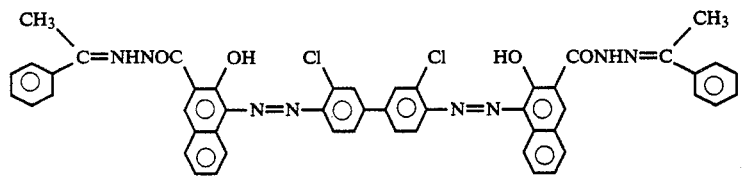
23.
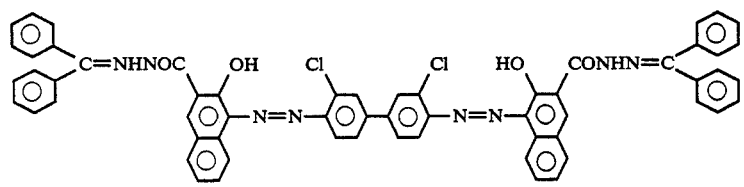
24.
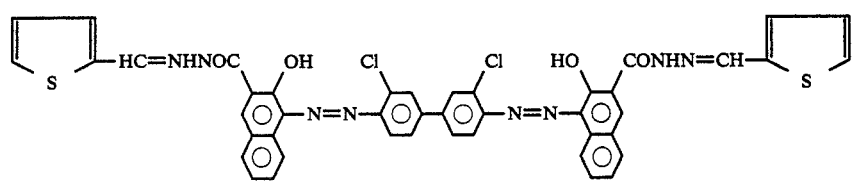
25.
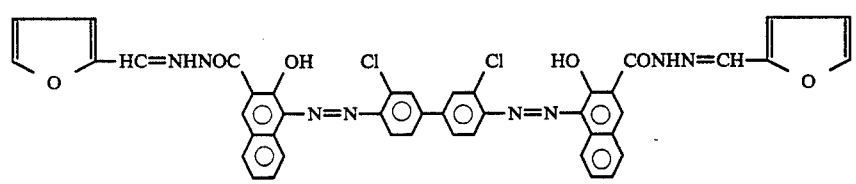
26.

-continued
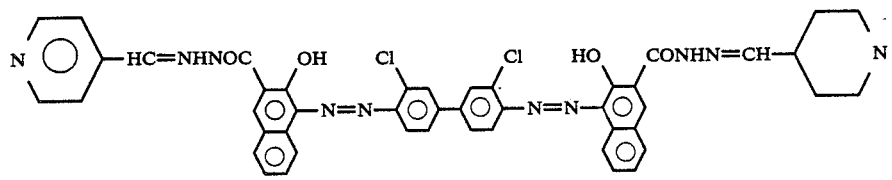
27.
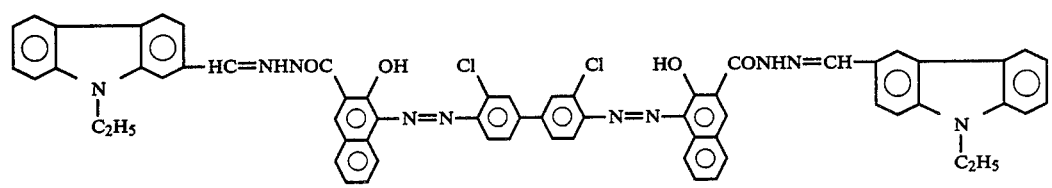
28.
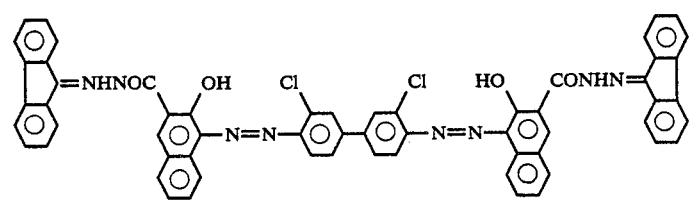
29.
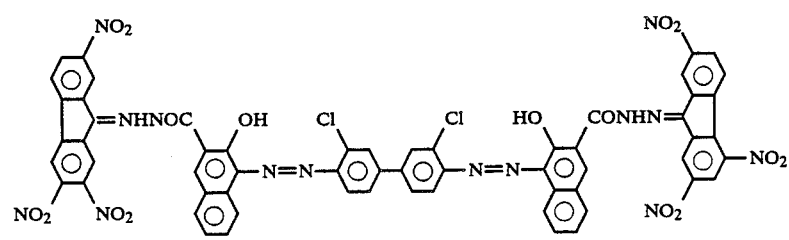
30.
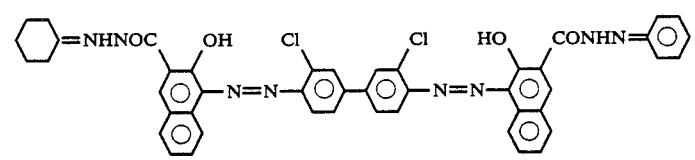
31.
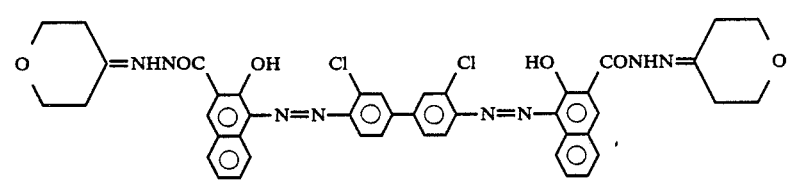
32.
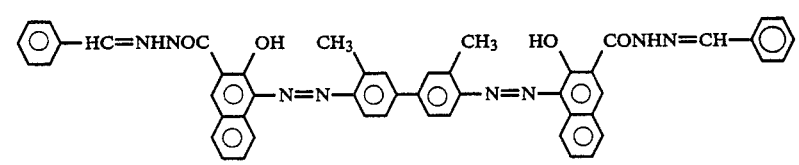
33.
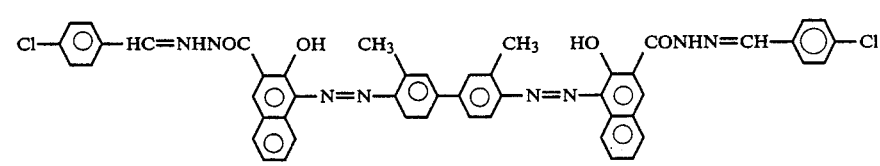
34.

35. 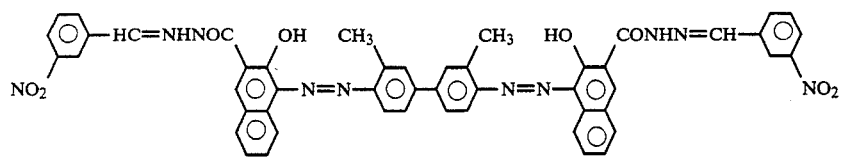
36. 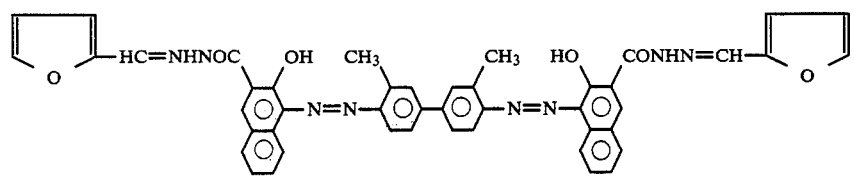
37. 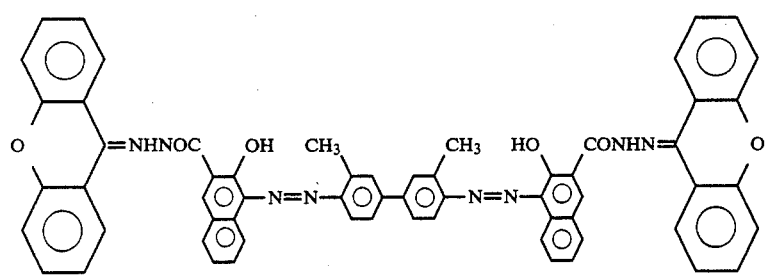
38. 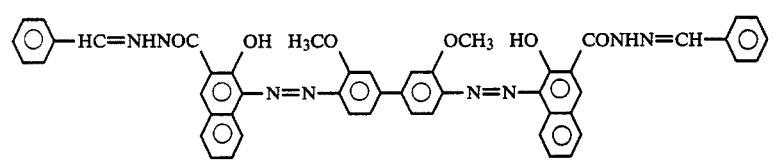
39. 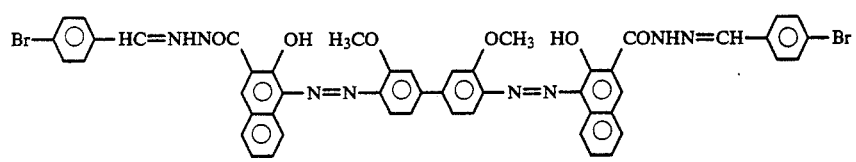
40. 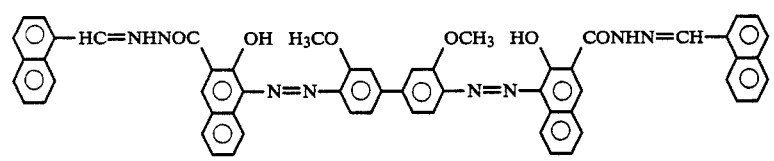
41. 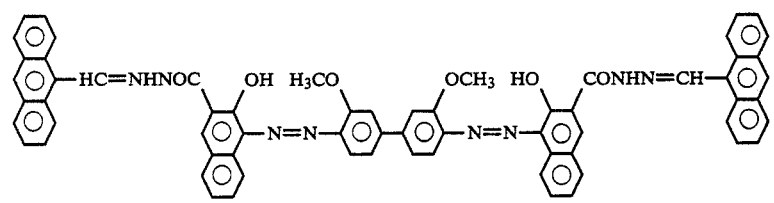
42. 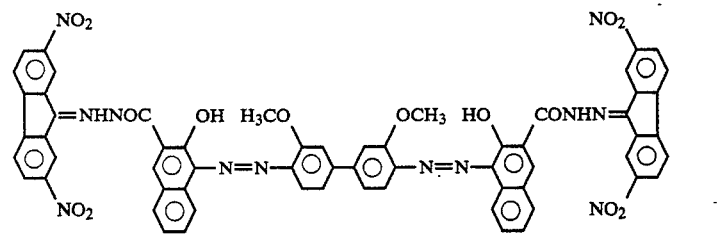

-continued

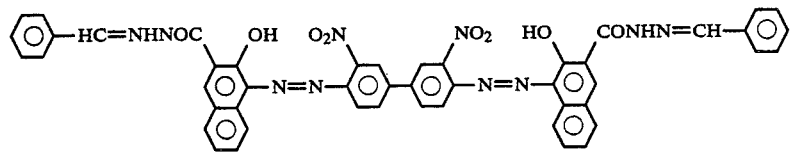
43.

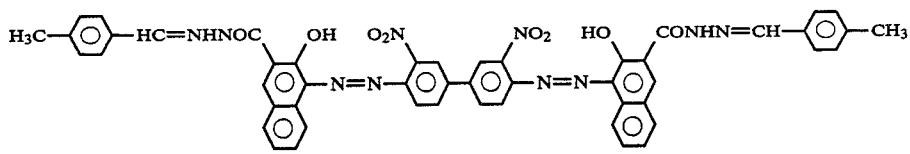
44.

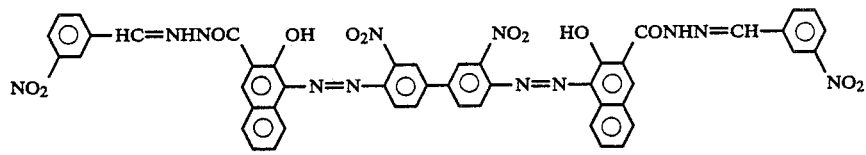
45.

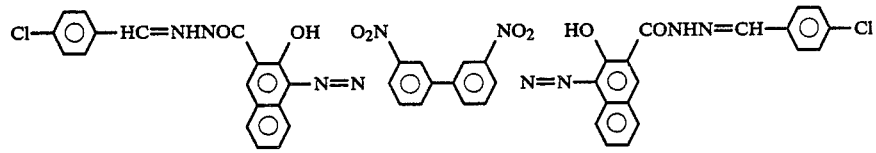
46.

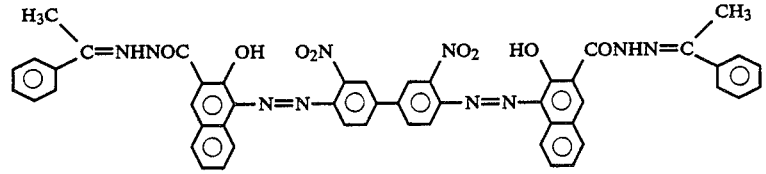
47.

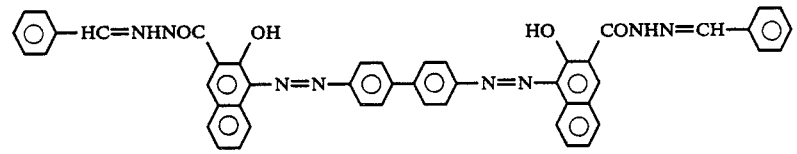
48.

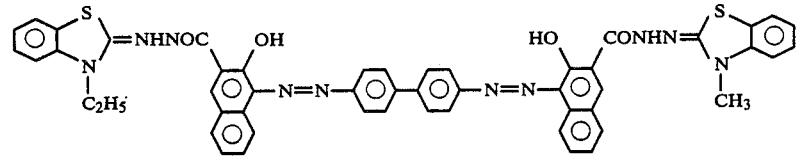
49.

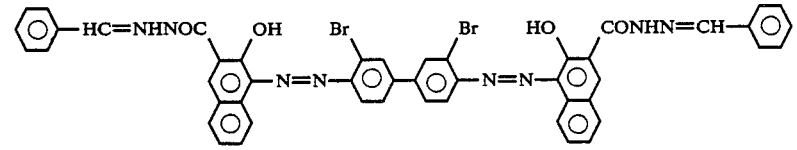
50.

The electrophotoconductor of this invention can take the structure in various embodiments. FIGS. 1–4 are sectional views showing the structure of the electrophotoconductor of this invention in various embodiments.

Figure 1:
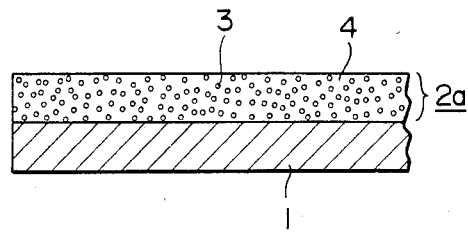
FIG. 1 shows a photoconductor comprising a conductive support (1) and formed thereon a photosensitive layer (2a) obtained by dispersing a disazo compound (3) in a binder (4).
Figure 2:
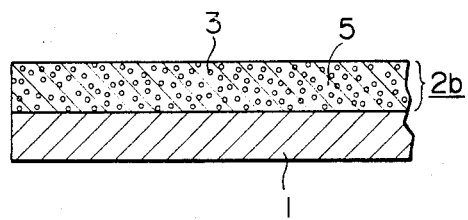
FIG. 2 shows a photoconductor comprising a conductive support (I) and formed thereon a photosensitive layer (2b) obtained by dispersing a disazo compound (3) in a carrier transporting medium (5) consisting of a carrier transporting substance and a binder.
Figure 3:
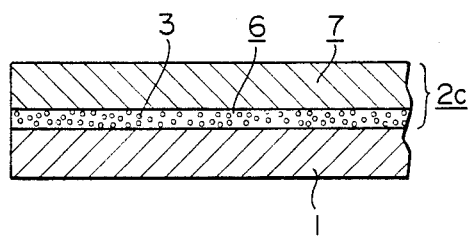
FIG. 3 shows a photoconductor comprising a conductive support (1) and formed thereon a photosensitive layer (2c) consisting of a carrier generating layer (6) composed mainly of a disazo compound (3) and a carrier transporting layer (7) composed of a carrier transporting substance and a binder.
Figure 4:
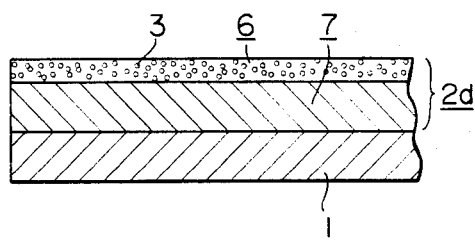
FIG. 4 shows a photoconductor comprising a conductive support (1) and formed thereon a photosensitive layer (2d) consisting of a carrier generating layer (6) composed mainly of a disazo compound (3) and a carrier transporting layer composed of a carrier transporting substance and a binder.

In the case of the photoconductor of FIG. 1, the disazo compound (3) both generates and transports the carrier, which is required for light decay. In the case of the photoconductor of FIG. 2, the carrier transporting substance forms the carrier transporting medium (5) together with the binder, and the disazo compound (3) acts as a carrier generating substance. The carrier transporting medium (5) has no such ability to generate a carrier as in the disazo compound, but acts to receive a carrier generated from the disazo compound and transport it. That is, in the photoconductor of FIG. 2, the formation of the carrier necessary for light decay is conducted by the disazo compound (3), while the transportation of the carrier is principally effected by the carrier transporting medium (5). In the photoconductors of FIGS. 3 and 4, the disazo compound (3) contained in the carrier generating layer (6) generates a carrier, while the carrier transporting layer (7) receives the carrier and transports it. Namely, the formation of the carrier needed for light decay is conducted by the disazo compound and the transportation of the carrier by the carrier transporting medium respectively as in the case of the photoconductor of FIG. 2.

The photoconductor shown in FIG. 1 is made by dispersing the disazo compound in a binder solution, coating the dispersion on the conductive support and drying it. The photoconductor shown in FIG. 2 is made by dispersing the disazo compound in a solution of the carrier transporting substance and the binder, coating the dispersion on the conductive support and drying it. The photoconductor shown in FIG. 3 is made by vapor-depositing the disazo compound on the conductive support or coating on the conductive support a dispersion of fine particles of the disazo compound in a solvent or a binder solution, drying it, coating thereon a solution containing the carrier transporting substance and the binder and drying it. The photoconductor shown in FIG. 4 is made by coating a solution containing the carrier transporting substance and the binder on the conductive support, drying it, vapor-depositing the disazo compound thereon, or coating on the conductive support a dispersion of fine particles of the disazo compound in a solvent or a binder solution and drying it. The coating operation is usually carried out by means of a roll coater, wire bar, doctor blade, etc.

The thickness of the photosensitive layer is 3 to 50 microns, preferably 5 to 20 microns in the photoconductors shown in FIGS. 1 and 2. The thickness of the carrier generating layer is not more than 5 microns, preferably 0.01 to 2 microns and the thickness of the carrier transporting medium is 3 to 50 microns, preferably 5 to 20 microns in the photoconductors shown in FIGS. 3 and 4. In the photoconductor of FIG. 1, the proportion of the disazo compound in the photosensitive layer is 10 to 70% by weight, preferably 30 to 50% by weight based on the photosensitive layer. In the photoconductor of FIG. 2, the proportion of the disazo compound in the photoconductive layer is 1 to 50% by weight, preferably 10 to 50% by weight, and the proportion of the carrier transporting substance is 10 to 90% by weight, preferably 10 to 60% by weight. The proportion of the carrier transporting substance in the carrier transporting medium of the photoconductors shown in FIGS. 3 and 4 is 10 to 95% by weight, preferably 10 to 60% by weight. In the production of the photoconductors shown in FIGS. 1–4, a plasticizer may be used along with the binder.

In the photoconductor of this invention, the electrically conductive support may be a plate or foil of a metal such as aluminum, a plastic film having a metal such as aluminum vapor-deposited thereon, or paper subjected to a conductivity imparting treatment. Examples of the binder include vinyl polymers such as polystyrene, polyacrylamide or poly-N-vinylcarbazole and condensation resins such as polyamide resins, polyester resins, epoxy resins, phenoxy resins and polycarbonate resins. These examples are not limitative, and all resins which are electrically insulating and have adhesion to the support can be used.

Known carrier transporting substances are available. Examples thereof are derivatives of heretocyclic compounds such as pyrazole, pyrazoline, oxadiazole, thiazole and imidazole, hydrazone derivatives, triphenylmethane derivatives, poly-N-vinylcarbazole and its derivatives. Of these, the pyrazoline derivatives and hydrazone derivatives are most effective. These carrier transporting substances may be used singly or as a mixture of two or more.

If required, an adhesive layer or a barrier layer may be formed between the conductive support and the photosensitive layer. Materials of such a layer are polyamides, nitrocellulose, casein and polyvinyl alcohol. It is advisable that the thickness of this layer is not more than 1 micron.

The photoconductor of this invention has excellent advantages that they are very high in sensitivity, panchromatic in a visible region, excellent in durability and rich in flexibility. Moreover, upon repeated use, accumulation of a residual potential or variations in surface potential and sensitivity are only to a very small extent.

The following Examples illustrate the present invention more specifically. All parts in these Examples are by weight.

EXAMPLE 1

One part of a polyester resin (Vylon 200, a tradename of a product of Toyobo Co., Ltd.), 3 parts of a disazo pigment No. 1 and 56 parts of tetrahydrofuran were pulverized and mixed in a vibration mill. The resulting dispersion was coated by a wire bar on a polyester film having aluminum vapor-deposited thereon, and dried to afford a photoconductor having a photosensitive layer with a thickness of about 2 microns. Said photoconductor had the structure shown in FIG. 1. The surface of the photosensitive layer in this photoconductor was charged by corona discharge at ±6 KV in a dark place using an electrophotographic paper testing device (Model SP-428, manufactured by Kawaguchi Denki Seisakusho) and left to stand in the dark place for 10 seconds. Subsequently, the photosensitive layer was subjected to light irradiation from a tungsten lamp so that the surface thereof reached an illumination of 5 luxes. The time which elapsed until the surface potential was reduced to one half of the surface potential after the photoconductor was left to stand in the dark place for 10 seconds was measured, and the photosensitivity, E1/2 (lux sec.) was determined. As a result, it was found to be 70 lux sec. in the positive charge and 52 lux sec. in the negative charge.

EXAMPLES 2-5

Photoconductors were produced as in Example 1 except that disazo pigments indicated in Table 1 were used in place of the disazo pigment No. 1. The sensitivity (E1/2) each of the photoconductors was measured and the results are shown in Table 1.

TABLE 1

| Example No. | Disazo pigment No. | Positive charge $E_{\frac{1}{2}}$ (lux sec.) | Negative charge $E_{\frac{1}{2}}$ (lux sec.) |
|---|---|---|---|
| 2 | 2 | 15 | 8.5 |
| 3 | 5 | 20 | 12 |
| 4 | 9 | 50 | 26 |
| 5 | 11 | 46 | 38 |

COMPARATIVE EXAMPLE 1

For comparison with Examples 1-5, a photoconductor was produced in the same way as in Example 1 except using a disazo pigment represented by the following formula:

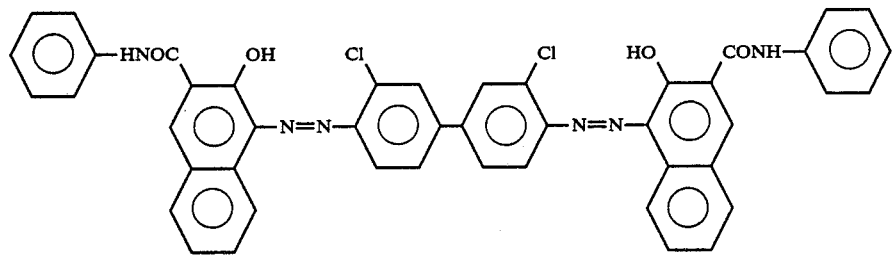

(described in Japanese Laid-open Patent Application No. 37543/72)

The sensitivity (E1/2) of the photoconductor was then measured as in Example 1 and found to be 500 lux sec. in the positive charge and 136 lux sec. in the negative charge. This reveals that the disazo pigment of the present invention has excellent carrier transportability.

EXAMPLE 6

Three parts of a polyarylate resin (U polymer U-100, a tradename of a product manufactured by Unitika Ltd.), 3 parts of 2,4,7-trinitro-9-fluorenone, 0.7 part of a disazo pigment No. 28 and 30 parts of tetrahydrofuran were pulverized and mixed in a ball mill. The resulting dispersion was coated by a wire bar on a polyester film having aluminum vapor-deposited thereon and dried to obtain photoconductor having a photosensitive layer with a thickness of about 9 microns. Said photoconductor had the structure shown in FIG. 2. The sensitivity (E1/2) of this photoconductor was measured as in Example 1 through corona discharge at −6 KV and found to be 1.8 lux sec.

EXAMPLE 7

A photoconductor was produced as in Example 6 except using a disazo pigment No. 11 instead of the disazo pigment No. 28. The sensitivity (E1/2) of the photoconductor was measured and found to be 3.2 lux sec.

EXAMPLE 8

Three parts of the same polyarylate resin as used in Example 6, 3 parts of 4,4'-benzylidene-bis-(N,N-diethyl-m-toluidine), 0.7 part of a disazo pigment No. 22 and 30 parts of tetrahydrofuran were pulverized and mixed in a ball mill. The resulting dispersion was coated by a wire bar on a polyester film having iridium oxide vapor-deposited thereon, and dried to afford a photoconductor having a photosensitive layer with a thickness of about 9 microns. Said photoconductor had the structure shown in FIG. 2. When the sensitivity (E1/2) of the photoconductor was measured as in Example 1 through corona discharge.

EXAMPLE 9

A photoconductor was produced as in Example 8 except using a disazo pigment No. 2 instead of the disazo pigment No. 22. The sensitivity (E1/2) of the photoconductor was measured and found to be 16 lux sec.

EXAMPLE 10

Three parts of a disazo pigment No. 1 was pulverized and mixed by a vibration mill in a solution obtained by dissolving 1 part of a phenoxy resin (PKHH, a tradename of a product manufactured by Union Carbide Corporation) in 75 parts of dioxane. The resulting dispersion was coated by a wire bar on a polyester film having aluminum vapor-deposited thereon, and dried to form a 1-micron thick carrier generating layer. On the carrier generating layer was coated by a wire bar a solution obtained by dissolving 5 parts of p-diethylaminobenzaldehyde-diphenylhydrazone and 5 parts of a polycarbonate resin (Panlite L-1250W, a tradename of a product manufactured by Teijin Chemicals Ltd.) in 65 parts of methylene chloride to form a 10-micron-thick carrier transporting layer. Thus, a photoconductor having the structure shown in Example 3 resulted. The sensitivity (E1/2) of the resulting photoconductor was measured as in Example 1 through corona discharge at −6 KV and found to be 4.0.

EXAMPLES 11-24

Photoconductors having the structure shown in FIG. 3 were formed as in Example 10 except that disazo pigments indicated in Table 2 were used instead of the disazo pigment No. 1. The sensitivity (E1/2) of each of the photoconductors was measured as in Example 10, and the results are shown in Table 2.

TABLE 2

| Example No. | Disazo pigment No. | $E_{\frac{1}{2}}$ (lux sec.) |
|---|---|---|
| 11 | 4 | 5.6 |
| 12 | 8 | 2.6 |
| 13 | 10 | 4.4 |
| 14 | 14 | 9.6 |
| 15 | 15 | 3.4 |
| 16 | 19 | 11 |
| 17 | 20 | 4.6 |
| 18 | 21 | 3.8 |
| 19 | 24 | 9.6 |
| 20 | 27 | 3.8 |

TABLE 2-continued

| Example No. | Disazo pigment No. | E½ (lux sec.) |
|---|---|---|
| 21 | 30 | 2.6 |
| 22 | 34 | 6.0 |
| 23 | 41 | 5.6 |
| 24 | 44 | 4.2 |

EXAMPLE 25

A carrier generating layer was formed as in Example 10 except that a disazo pigment No. 9 was used instead of the disazo pigment No. 1. Subsequently, a photoconductor was produced as in Example 10 except using 2,5-bis(p-diethylaminophenyl)-1,3,4-oxaxiazole as a carrier transporting layer instead of p-diethylaminobenzaldehyde-diphenylhydrazone. The sensitivity (E1/2) of the thus obtained photoconductor was measured as in Example 10 and found to be 2.6 lux sec.

EXAMPLES 26–29

Photoconductors were produced as in Example 25 except that disazo pigments indicated in Table 3 were used in place of the disazo pigment No. 9. The sensitivity (E1/2) each of the photoconductors was measured and the results are shown in Table 3.

TABLE 3

| Example No. | Disazo pigment No. | E½ (lux sec.) |
|---|---|---|
| 26 | 25 | 13 |
| 27 | 33 | 21 |
| 28 | 40 | 15 |
| 29 | 43 | 30 |

What is claimed is:

1. An electrophotoconductor comprising an electrically conductive support and formed on the surface thereof a photosensitive layer containing a disazo compound of formula

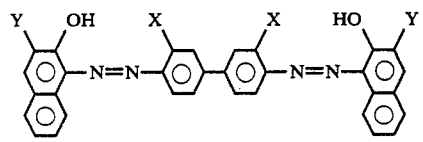     (I)

wherein
two Y's, which are the same or different, denote a group selected from the class consisting of

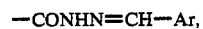     (II)

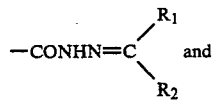     (III)

     (IV)

two X's, which are the same or different, denote an atom or a group selected from the class consisting of H, $CH_3$, $OCH_3$, Cl, Br and $NO_2$, Ar denotes a group such as a phenyl group, a naphthyl group, an anthryl group, a pyridyl group, a thienyl group, a furyl group or a carbazolyl group which may have a substituent, $R_1$ and $R_2$, which are the same or different, denote an alkyl group or an aryl group that may have a substituent, and

denotes a cyclic hydrocarbon group or a heterocyclic group which may have a substituent.

2. The electrophotoconductor of claim 1 wherein a photosensitive layer obtained by dispersing the disazo compound of formula (I) in a binder is formed on the surface of the electrically conductive support.

3. The electrophotoconductor of claim 1 wherein a photosensitive layer obtained by dispersing the disazo compound of formula (I) in a carrier transporting medium composed of a carrier transporting substance and a binder is formed on the surface of the electrically conductive support.

4. The electrophotoconductor of claim 1 wherein a photosensitive layer, which is a laminate of a carrier generating layer composed mainly of the disazo compound of formula (I) and a carrier transporting layer consisting of a carrier transporting substance and a binder, is formed on the surface of the electrically conductive support so that the carrier generating layer is brought into contact with the surface of the electrically conductive support.

5. The electrophotoconductor of claim 1 wherein a photosensitive layer which is a laminate of a carrier generating layer composed mainly of the disazo compound of formula (I) and a carrier transporting layer consisting of a carrier transporting substance and a binder is formed on the surface of the electrically conductive support so that the carrier transporting layer is brought into contact with the surface of the electrically conductive support.

6. The electrophotoconductor of claim 1 wherein

represents a divalent hydrocarbon ring residue selected from the group consisting of

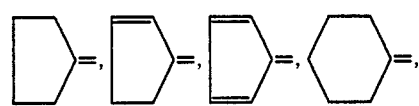

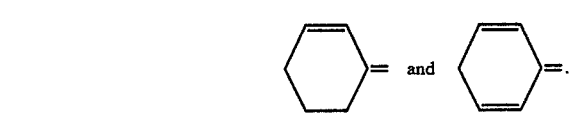

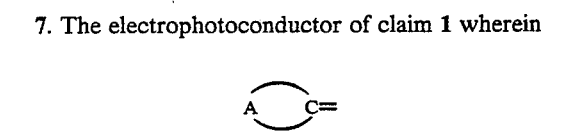

7. The electrophotoconductor of claim 1 wherein

represents a divalent heterocyclic ring residue selected from the group consisting of

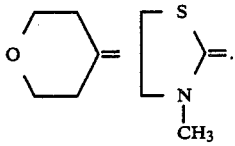

8. The electrophotoconductor of claim 1 wherein

represents a divalent fused hydrocarbon ring selected from the group consisting of

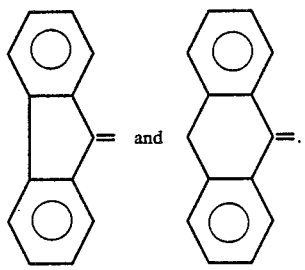

9. The electrophotoconductor of claim 1 wherein

represents a divalent fused heterocyclic ring residue selected from the group consisting of

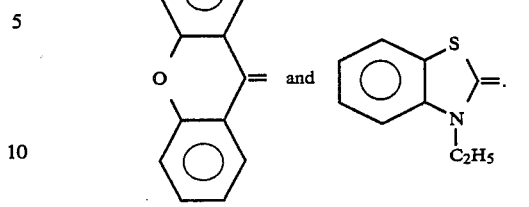

10. The electrophotoconductor of claim 1 wherein the substituent on the groups $A_r$, $R_1$, $R_2$ and

are selected from the group consisting of alkyl groups, alkoxy groups, acyl groups, alkylamino groups, alkylester groups, phenyl ester groups, phenyl carbamoyl, nitro and cyano.

11. The electrophotoconductor of claim 2 wherein the photosensitive layer has a thickness of from about 3 to 50 microns and wherein the proportion of the disazo compound of formula (I) in the photosensitive layer is from about 10 to 70% by weight.

12. The electrophotoconductor of claim 3 wherein the photosensitive layer has a thickness of from about 3 to 50 microns and wherein the proportion of the disazo compound in the photoconductive layer is from about 1 to 50% by weight and the proportion of the carrier transporting substance is from about 10 to 90% by weight.

13. The electrophotoconductor of claim 4 wherein the carrier generating layer has a thickness of not more than about 5 microns and the carrier transporting medium has a thickness of from about 3 to 50 microns and wherein the proportion of the carrier transporting substance in the carrier transporting medium is from about 10 to 90% by weight.

14. The electrophotoconductor of claim 5 wherein the carrier generating layer has a thickness of not more than about 5 microns and the carrier transporting medium has a thickness of from about 3 to 50 microns and wherein the proportion of the carrier transporting substance in the carrier transporting medium is from about 10 to 90% by weight.

* * * * *